United States Patent [19]

Munday

[11] 3,773,678
[45] Nov. 20, 1973

[54] PROCESS FOR AGGLOMERATING SODIUM CARBONATE PEROXIDE

[75] Inventor: Theodore F. Munday, Kensall Park, N.J.

[73] Assignee: FMC Corporation, New York, N.Y.

[22] Filed: Nov. 9, 1971

[21] Appl. No.: 197,137

[52] U.S. Cl. ............ 252/186, 23/313, 252/385, 423/273, 423/272, 423/582
[51] Int. Cl. ............ C01b 15/04, B01j 2/12
[58] Field of Search ............ 252/186, 385; 423/272, 273, 582, 583, 586; 23/313

[56] References Cited
UNITED STATES PATENTS

| | | | |
|---|---|---|---|
| 3,463,618 | 8/1969 | Harris et al. | 23/313 |
| 3,687,640 | 8/1972 | Sams et al. | 23/313 |
| 3,532,473 | 10/1970 | Biegler et al. | 23/313 |
| 3,003,910 | 10/1961 | Dithmar et al. | 252/186 |
| 3,623,846 | 11/1971 | Haag et al. | 23/313 |

*Primary Examiner*—Leon D. Rosdol
*Assistant Examiner*—Irwin Gluck
*Attorney*—Frank Ianno et al.

[57] ABSTRACT

A process is provided for producing strong agglomerates of sodium carbonate peroxide by subjecting particles of sodium carbonate peroxide to rotary agitation, contacting the particles with an aqueous sodium silicate solution, continuing the rotary agitation of the wet particles until they have become agglomerated, drying the wet, agglomerated particles at temperatures between room temperature, e.g., 25°C., and 80°C. and recovering dry agglomerates having a size of 16 to 40 mesh, a bulk density of 0.4 to 0.9 g/cc, and containing sufficient sodium silicate to provide 1 to 5 percent by weight $SiO_2$.

8 Claims, No Drawings

PROCESS FOR AGGLOMERATING SODIUM CARBONATE PEROXIDE

Sodium carbonate peroxide is a crystalline compound having the formula $Na_2CO_3 \cdot 3/2 H_2O_2$ which is capable of releasing hydrogen peroxide in aqueous solution. Because of this the sodium carbonate peroxide is useful as a bleaching agent in formulating dry detergent formulations. In preparing a suitable detergent formulation the ingredients of the formulation are blended together with the sodium carbonate peroxide in a dry state and the mixture subsequently packaged. In general, the use of water or substantial amounts of moisture are detrimental to the stability of the sodium corbonate peroxide and, therefore, are avoided.

One of the problems that has arisen in formulating such detergent compositions is that the sodium carbonate peroxide is commonly crystallized in the form of very small particles whose size is much smaller than the other particles normally employed in the detergent formulation. In addition, the bulk density of the sodium carbonate peroxide is substantially higher than that of the remaining ingredients of the detergent formulation. This results in undesired segregation of the components of the detergent formulation after packaging. Attempts to crystallize sodium carbonate peroxide particles of larger size and with the desired bulk density have not been successful thus far. In general, these crystallized products do not have the particle strength required by detergent manufacturers to resist being crushed in the apparatus used to handle and blend the various ingredients of the detergent mixture.

As a result, it has been desired to produce a sodium carbonate peroxide agglomerate which has sufficient strength to resist being crushed by conventional conveying and blending equipment used in formulating detergents. It is also desired to produce a sodium carbonate peroxide agglomerate whose particle size and bulk density are sufficiently compatible with the other ingredients of the detergent formulation that no segregation of the final mixture occurs.

In accordance with the present invention strong, stable agglomerates of sodium carbonate peroxide are produced by subjecting particles of sodium carbonate peroxide to rotary agitation, contacting the particles with an aqueous sodium silicate solution, continuing the rotary agitation of the wetted particles until they have become agglomerated, drying the wet agglomerated particles at temperatures of about 20° to about 80°C., and recovering dry agglomerates having a bulk density of 0.4 to 0.9 g/cc (preferably 0.5 to 0.7 g/cc) and containing sufficient sodium silicate to provide 1 to 5 percent by weight $SiO_2$.

In carrying out the present invention, a free-flowing powdered sodium carbonate peroxide is used as the feed. The sodium carbonate peroxide may be obtained by any of the known prior art processes including crystallization from a mother liquor with or without inert solvents or salting out from a solution by use of added salts having higher solubility than the sodium carbonate peroxide in the mother liquor. The sodium carbonate peroxide should be finely divided, having a particle size of less than about 50 mesh and, preferably, below 100 mesh.

The free-flowing sodium carbonate peroxide is added continuously to a rotating drum or a rotating disc which may be equipped with suitable baffles in order to prevent buildup of material adhering to the drum or disc surface. The term "rotary agitation" is intended to cover the tumbling, rolling and rotating movement generally imparted to the particles by the rotating disc or drum. The preferred equipment is a rotating disc, a Dravo-Lurgi Disc, such as manufactured by the Dravo Company. While the sodium carbonate peroxide is in rotary agitation, it is contacted with an aqueous solution of sodium silicate, preferably by spraying a sodium silicate solution onto the moving particles. Undissolved sodium silicate is not desired in silicate solutions being sprayed. The solution may contain sufficient sodium silicate to provide 4 to 25 percent by weight $SiO_2$; solutions sufficient to provide about 5 to 20 percent $SiO_2$ are preferred. The sodium silicate employed may have $SiO_2$ to $Na_2O$ weight ratios of 1.0 up to 3.2, but the preferred ratios are those having reduced amounts of $SiO_2$, for example, a sodium silicate having an $SiO_2/Na_2O$ weight ratio of about 1.6. The sodium silicates having lower amounts of $SiO_2$ are preferred because they appear to increase the stability of the sodium carbonate peroxide in the final product. The sodium silicate solution that contacts the particles may be at room temperature, but mild heating somewhat above room temperature, e.g., 30° to 35°C., is preferred since this reduces the viscosity of the solution when it is applied by spraying. The sodium carbonate peroxide which is under rotary agitation may also be mildly heated, although operation at room temperature is satisfactory.

Upon contacting the rotary agitated, sodium carbonate peroxide particles with sodium silicate solution, the individual particles begin to agglomerate. The agglomerates continue to increase in size and are removed from the agglomerating apparatus when they reach a desired size. Normally, the agglomerated product is desired in a size of about 16 to 40 mesh. The amount of sodium silicate solution which is applied to the sodium carbonate peroxide may be varied so that there remains on the final product sufficient sodium silicate to provide 1 to 5 percent by weight $SiO_2$ (sodium silicate contents are analyzed and reported as weight percent $SiO_2$ in the sample).

The wet agglomerates, after being removed from the agglomerating zone, are dried to remove the free water which is present. The drying stage can be carried out by allowing the agglomerates to stand at room temperature, e.g., 20°C., or preferably by heating the agglomerates to moderate temperatures, up to about 80°C., or by vacuum drying. The preferred drying condition is moderate heating of the agglomerates at temperatures high enough to dry off the excess water, but low enough to prevent loss of active oxygen from the agglomerated sodium carbonate peroxide. Thus, about 60°C. is a desirable drying temperature. A convenient apparatus for drying is a fluid bed wherein the particles are supported on an upward flowing stream of dry, heated air or other drying gas.

While the above process has been described with reference to agglomerating sodium carbonate peroxide alone, it is considered within the scope of the present invention to agglomerate sodium carbonate peroxide containing minor amounts of common ingredients present in detergent formulations, such as sodium carbonate, sodium tripolyphosphate, sodium sulfate, wetting agents and the like. Minor amounts of such additives do not affect the agglomerating property of the sodium carbonate peroxide, and may be included to supply these ingredients in conventional detergent formulations.

The following operating examples are provided to illustrate the invention. All proportions used herein are by weight unless otherwise specified.

EXAMPLE

Sodium carbonate peroxide particles, having an active oxygen content of 14.4 percent, a bulk density of 1.0 and a size of 66 percent −100 mesh, were continuously added onto a fourteen inch diameter Dravo-Lurgi Disc rotating at 30 rpm and inclined at 45°. The tumbling particles on the disc were then sprayed with an aqueous sodium silicate solution analyzing 23 weight percent $SiO_2$ in a weight ratio of solution to feed particles of about 1:10. The sodium silicate used to make up the solution had an $SiO_2/Na_2O$ mole ratio as set forth in the Table. Spraying of the silicate solution was continued until the resulting particles had retained the amount of silicate specified in the Table. As the silicate solution was sprayed onto the tumbling particles, they commenced to agglomerate. The wet agglomerated sodium carbonate peroxide particles continued to grow until they reached the size where they were able to spill from the rotating disc. Fine particles were separated for recycling. The spilled particles were dried in a fluid bed maintained at 60°C. for an average residence time of seven minutes. The dry particles were then analyzed and tested to determine their sodium silicate (reported as weight percent $SiO_2$) content, active oxygen, bulk density, insolubles content when dissolved in water, and particle size; these are reported in the Table.

In addition to the above, the frangibility and five-day stability values were also determined and are reported in the Table. The frangibility test is a measure of the strength of the dry particles and is conducted as follows.

A sample of the particles is screened and the −10 +100 mesh fraction is placed on a 100 mesh screen in a RO-TAP apparatus. Three 3.5 cm. diameter rubber balls, each weighing 28 g., are placed in the 100 mesh screen, covered, and the RO-TAP activated for 15 minutes. The fraction passing through the −100 mesh screen, compared to the weight of the sample, is reported as percent frangibility. The smaller the percent frangibility, the more resistant to breakdown is the sample.

The 5-day stability test is conducted as follows:
A 1 g. sample is placed in a dry, clean 250 ml. wide mouth Erlenmeyer flask and covered with a polyethylene-coated Kraft paper which is sealed about the edges of the flask. The sealed flask is placed in a controlled atmosphere at 120°±2°F. and 90±2 percent relative humidity for 5 days. The loss of active oxygen after the 5 days is determined by ceric ammonium sulfate titration to a ferroin end point. The ratio of the active oxygen content remaining over the original active oxygen content of the sample is reported as percent stability.

TABLE

| | Mole ratio, $SiO_2/Na_2O$ | Silicate in product, weight percent $SiO_2$ | Percent AO | Bulk density | Percent insolubles | 5-day stability, percent | Frangibility, percent | Particle size −16 +40 | −40 +100 | −100 |
|---|---|---|---|---|---|---|---|---|---|---|
| 6468-1-92-1 | 1.6 | 2.2 | 13.4 | .57 | .34 | 81.3 | 28.0 | 48 | 52 | 0 |
| -2 | | 3.1 | 13.7 | .53 | .42 | 75.9 | 8.5 | 50 | 49 | 1 |
| -3 | | 3.6 | 12.8 | .60 | .43 | 74.2 | 3.0 | 95 | 4 | 0 |
| -4 | | 4.7 | 12.5 | .45 | .52 | 69.6 | | 79 | 18 | 1 |
| 90-1 | 2.0 | 2.6 | 13.6 | .54 | .50 | 69.1 | 19.8 | 60 | 40 | 1 |
| -4 | | 3.2 | 13.4 | .53 | .48 | 67.2 | 7.8 | 63 | 38 | 0 |
| -2 | | 4.3 | 12.9 | .60 | .62 | 65.9 | | 92 | 8 | 0 |
| -3 | | 4.4 | 12.7 | .57 | .59 | 57.4 | 3.3 | 89 | 10 | 0 |
| 91-2 | 3.2 | 3.1 | 13.5 | .47 | .83 | 66.7 | 20.8 | 83 | 17 | 0 |
| -3 | | 3.5 | 13.5 | .53 | 1.12 | 67.4 | 12.2 | 82 | 18 | 0 |
| -1 | | 3.5 | 13.2 | .53 | 1.22 | 66.7 | 13.0 | 79 | 21 | 0 |
| -4 | | 3.8 | 13.5 | .59 | 1.33 | 63.7 | 7.8 | 84 | 16 | 0 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for producing strong, stable agglomerates of sodium carbonate peroxide comprising subjecting particles of sodium carbonate peroxide to rotary agitation, contacting the rotating particles with an aqueous sodium silicate solution, continuing the rotary agitation of resultant wetted particles until they have become agglomerated, drying the resulting wet, agglomerated particles at temperatures of from 20°C. to 80°C., recovering dry agglomerated particles having a bulk density of 0.4 to 0.9 g/cc and containing sufficient sodium silicate to provide about 1 to 5 percent by weight $SiO_2$.

2. Process of claim 1 wherein an aqueous sodium silicate solution is sprayed onto the rotating sodium carbonate peroxide particles.

3. Process of claim 1 wherein the sodium carbonate peroxide feed has a size of below 50 mesh.

4. Process of claim 1 wherein the dry, agglomerated product has a size of 16 to 40 mesh.

5. Process of claim 1 wherein the solution has a concentration of sodium silicate sufficient to provide about 5 to 20 percent $SiO_2$.

6. Process of claim 1 wherein the sodium silicate utilized has an $SiO_2/Na_2O$ weight ratio of 1 to 3.

7. Process of claim 1 wherein the wet agglomerated particles are dried in a fluid bed at temperatures of about 20° to about 80°C.

8. The process of claim 1 wherein the recovered dry, agglomerated particles contain sufficient sodium silicate to provide at least 3.1 percent by weight of $SiO_2$.

* * * * *